United States Patent [19]

Schultze et al.

[11] Patent Number: 5,043,182

[45] Date of Patent: Aug. 27, 1991

[54] METHOD FOR THE PRODUCING OF CERAMIC-METAL COMPOSITE MATERIALS BY PLASMA SPRAYING SEVERAL LAYERS OF CERAMIC PARTICLES ONTO A BASE BODY AND INFILTRATING MOLTEN METAL INTO THE PORES OF THE CERAMIC MATERIAL

[75] Inventors: Werner Schultze, Bonn; Stefan Schindler, Rheinbreitbach; Friedrich-Ulf Deisenroth, Lohmar, all of Fed. Rep. of Germany

[73] Assignee: Vereinigte Aluminum-Werke Aktiengesellschaft, Bonn, Fed. Rep. of Germany

[21] Appl. No.: 514,002

[22] Filed: Apr. 25, 1990

[30] Foreign Application Priority Data

Apr. 26, 1989 [DE] Fed. Rep. of Germany ....... 3914010

[51] Int. Cl.$^5$ .............................................. B05D 1/00
[52] U.S. Cl. .................................... 427/34; 427/238; 427/314; 427/398.1; 427/404; 427/431
[58] Field of Search ................. 427/329, 376.3, 383.5, 427/431, 443.2, 427, 34, 310, 314, 404, 398.1

[56] References Cited

U.S. PATENT DOCUMENTS

| | | | |
|---|---|---|---|
| 3,928,662 | 12/1975 | Kaneko et al. | 427/294 |
| 4,033,400 | 7/1977 | Gurmell et al. | 164/98 |
| 4,604,249 | 8/1986 | Luhleigh et al. | 264/295 |
| 4,673,435 | 6/1987 | Yamaguchie et al. | 75/235 |
| 4,784,159 | 11/1988 | Szilogyi | 427/34 |
| 4,853,250 | 8/1989 | Baulos et al. | 427/34 |
| 4,868,143 | 9/1989 | Newkirk et al. | 501/127 |
| 4,905,887 | 3/1990 | Schoer et al. | 228/217 |

FOREIGN PATENT DOCUMENTS

| | | |
|---|---|---|
| 0256963 | 7/1987 | European Pat. Off. . |
| 2402872 | 1/1974 | Fed. Rep. of Germany . |
| 3543342A1 | 12/1985 | Fed. Rep. of Germany . |
| 3616578A1 | 5/1986 | Fed. Rep. of Germany . |
| 3707396A1 | 3/1987 | Fed. Rep. of Germany . |
| 61-163224 | 7/1986 | Japan . |
| WO89/07985 | 3/1989 | PCT Int'l Appl. . |
| 2148270A | 9/1984 | United Kingdom . |
| 2148270 | 5/1985 | United Kingdom . |

OTHER PUBLICATIONS

Chem. Abst. 103: 127989.

*Primary Examiner*—Shrive Beck
*Assistant Examiner*—Benjamin L. Utech
*Attorney, Agent, or Firm*—Darby & Darby

[57] ABSTRACT

A method for the production of ceramic-metal composite materials, in which ceramic materials are infiltrated with molten metal, includes building up a porous ceramic material of several layers by spraying on a base body, the thickness of the layers being between 10 and 150 microns with an average pore radius of between 100 and 1,000 nm, an open porosity of 5–14% and an overall porosity of 5–30%; and filling molten metal into the pore volume up to a residual pore volume of 0.1 to 10%, based on the initial porosity. In an alternate embodiment, a gradient structure of the ceramic is created by increasing or decreasing the particle size of the ceramic material while spraying layers. In the gradient structure, infiltration of molten metal is greatest in the layers sprayed with particles having the largest diameter.

12 Claims, No Drawings

METHOD FOR THE PRODUCING OF CERAMIC-METAL COMPOSITE MATERIALS BY PLASMA SPRAYING SEVERAL LAYERS OF CERAMIC PARTICLES ONTO A BASE BODY AND INFILTRATING MOLTEN METAL INTO THE PORES OF THE CERAMIC MATERIAL

FIELD OF THE INVENTION

The present invention relates to a method for the production of ceramic-metal composite materials. In particular, it relates to a method of infiltrating a ceramic material with molten metal.

BACKGROUND OF THE INVENTION

There are several known methods for producing ceramic-metal composite materials.

Japanese Patent 61/163224 (Sumitomo Electric Industries) of July 23, 1986, discloses a ceramic body having a porosity of 85–90%, infiltrated with aluminum melt under pressure.

Moreover, British Patent 21 48 270 (British Ceramic Research Association) of May 30, 1985, discloses the production of cermets by the infiltration of a porous SiC ceramic having a porosity of 39% with molten aluminum at a temperature of 700° C. and a pressure of 6.72 kpsi.

Other cermets are disclosed in the Czechoslovakian Patent CS 20 61 32 of Oct. 1, 1983. They are produced by evacuating a porous ceramic material, which consists of 90–95% $Al_2O_3$, the remainder being $SiO_2$, and infiltrating it with aluminum or aluminum compounds at temperatures of 700° to 900° C. under an inert gas and at a pressure of more than 1 MPa. Before the infiltration, the molded ceramic article has a porosity of 41%.

In the state of the art therefore, highly porous ceramic materials are infiltrated with a molten metal so that the product produced therefrom has primarily a metallic structure. The properties of this metal-ceramic material are largely metallic in nature so that the hardness, temperature resistance and wear behavior are far below those of strictly ceramic materials.

SUMMARY OF THE INVENTION

It is an object of the present invention to produce a ceramic-metal composite material which achieves the positive qualities of a metallic material (bending strength, toughness, modulus of elasticity) while maintaining the positive qualities of a ceramic material (hardness, temperature resistance and wear resistance).

Moreover, it is another object of the invention to provide a structure for a ceramic-metal composite material where metallic properties predominate a predetermined portion of the material so that joining this portion to a metal structure can be facilitated.

According to the present invention, several layers of ceramic material are built up by spraying on a base body prior to infiltration with a molten metal. It has been discovered that infiltration of a multilayer construction of the ceramic with an overall porosity of 5–30% makes the desired combination of metal and ceramic properties possible. The overall porosity, moreover, is the initial porosity of the ceramic before the infiltration with a molten metal. It has also been determined that the optimum average pore radius is from 100–1,000 nm, which is determined with a Carlo-Erba mercury porosimeter.

By means of multilayer construction, a pore network structure of the ceramic material is attained which can be infiltrated in a particularly advantageous manner with a molten metal. Pursuant to the invention, the pore network structure can be controlled by the particle size of the ceramic material used, as well as by the rate of application of ceramic material in a liquid-stabilized plasma jet.

For the development of uniform pore structures, the ceramic material should be maintained at a temperature between 100° and 500° C. during the plasma spraying. Cooling of the infiltrated ceramic material must take place within narrow limits of 100° C./h for gray cast iron and steel, or 200° C./h for aluminum alloys, in order to produce a homogeneous, stress-free metal structure.

It has been discovered experimentally that, in the case of a particularly fine pore network structure, a lowering of the viscosity of the molten metal is advantageous for wetting the ceramic. Pursuant to the present invention, this is accomplished by the addition of special alloying elements, such as bismuth, antimony, strontium, beryllium, sodium, potassium, and lithium, which enhance the penetration of the molten aluminum or aluminum alloy into the interior of the porous ceramic material.

For certain applications, such as joining to metal structures by welding or soldering ceramic/metal constructions, it has proven to be useful to have the porosity of the ceramic material increase from the inside to the outside and thus to have an increasing proportion of metal towards the outside. A pore network of such a construction is referred to as a "gradient structure". In such a structure, the metallic properties predominate in the outer zone of the composite, while the ceramic properties are preeminent in the interior.

According to the invention, a gradient structure is achieved by a variation of the ceramic particle size during the spraying onto the base body in a liquid-stabilized plasma jet. Initially, for example, a very fine powder with particles having an average diameter ($d_{50}$) of 20 microns is used. The particle size in the outer layers of the ceramic material is increased to a $d_{50}$ value of more than 100 microns. Moreover, the reverse procedure is also possible, depending on where the side facing the metal surface is. Thus, the surface of the ceramic composite which is to be joined to a metal construction is produced from the powder with the larger particle diameter.

DESCRIPTION OF THE PREFERRED EMBODIMENTS

As used in this specification and the attached claims, "open porosity" refers to open pores which are capable of infiltration by molten metal; "initial porosity" is the total porosity of the ceramic material before infiltration"; and "overall porosity" or "total porosity" is the sum of the open porosity and the closed porosity.

The invention is described in greater detail by means of two examples of the method and by comparison of the produced product with other products. In the comparison, the properties of wholly ceramic materials which were prepared by plasma spraying are compared with the metal-infiltrated ceramic composite material (CMC = ceramic-metal composite) produced according to the invention. This comparison reveals that the new CMC materials, with a residual pore volume of 0.1 to 10% of the initial porosity (i.e., the porosity of the ceramic material before infiltration), have distinct advantages.

The comparison, which is illustrated in Table 1, is supplemented with the property values of a metal-ceramic composite material produced according to the invention with a gradient structure. These additional values show that the material properties of the gradient structure have been improved distinctly once again in comparison to the properties of the improved, inventive composite materials without a gradient structure.

The density and porosity values shown in Table 1 were determined by the DIN 51056 method and the Vickers hardness values were determined by the DIN 50133 method.

EXAMPLE 1

Panels of $Al_2O_3$ and $Al_2TiO_5$ materials were produced by plasma spraying. The particle size ($d_{50}$) was between 60 and 70 microns and the application rate while spraying the plasma jet was 300 m/s. The thickness of the individual layers applied was 100 microns and the overall porosity achieved was 18% for aluminum oxide and 15% for aluminum titanate. The form factor of the particles sprayed on was from 5:1 to 20:1 for aluminum oxide and from 15:1 to 25:1 for aluminum titanate. As used herein, "form factor" (or shape factor) means the ratio of the surface area to the thickness of a single particle.

Test pieces with dimensions of 100×100×30 mm were cut from these panels for determining the characteristic material values referred to in Table 1. Some of these test pieces were then preheated to a temperature of 1,000° C. and infiltrated with a molten metal consisting of an AlSi10Mg alloy at 750° C. with a pressure difference of 35 bar within a period of 15 seconds. The cooling rate after the infiltration was 200° C. per hour in a program controlled furnace, so that the parts cooled down to room temperature within 5 hours. After that, the residual pore volume was found to be 0.5% of the initial porosity in the case of the aluminum oxide ceramic and 0.7% in the case of aluminum titanate.

EXAMPLE 2

A further experimental body was produced with the inventive gradient structure. The manufacturing conditions were the same as those in Example 1; however, particles of two different sizes, i.e. a $d_{50}$ value of 40 and 100 microns respectively, were applied through two channels. The flow of particles with the $d_{50}$ value of 40 microns was increased continuously from 0 to 25 kg/h, while the flow of particles with the $d_{50}$ value of 100 microns was decreased to the same extent from 25 kg/h to 0. The switching over from the one channel to the other was completed within one hour. The thicknesses of the individual layers, so obtained, was between 80 and 100 microns and the overall porosity was 12%. After infiltration with an AlSi10Mg alloy, the experimental body had a residual pore volume of 0.6%, based on the initial porosity.

COMPARISON

The values measured on the experimental bodies are summarized in Table 1. The values for the bending strength (4-point bending device), modulus of elasticity and fracture toughness were determined on standard bending samples having the dimensions of 3.5×4.5×45 mm. The material data (literature values) of a conventionally prepared, entirely ceramic sintered body of $Al_2O_3$ are given for comparison. It can be seen from the table that the ceramic-metal composite materials produced according to the invention have very good values for bending strength, fracture toughness and hardness and thus represent a clear improvement in comparison with conventional materials with respect to the combination of the characteristic material values as well as with respect to the individual characteristic values.

Although the invention is described with reference to a plurality of embodiments, it is to be expressly understood that it is in no way limited to the disclosure of such preferred embodiments but is capable of numerous modifications within the scope of the appended claims.

For example, it has been found to be advantageous if the temperature of the molten metal is kept 100° to 200° C. above the melting point of the metal.

Moreover, when creating the ceramic material by spraying with particles having an average diameter of 20 to 180 microns, it is advantageous that, after spraying, the particles be flattened into longitudinal particles having a form factor of more than 5.

Other variations of the inventive method include: adding the ceramic material to a closed mold, heating it to the melting temperature of the molten metal, evacuating it and infiltrating it within 5–60 seconds with molten metal under pressure; and applying one layer of metallic material after formation of the ceramic body and melting the applied metal by increasing the temperature of the ceramic body.

TABLE 1

| Characteristic Values | | Materials | | | | | |
|---|---|---|---|---|---|---|---|
| | | $Al_2O_3$ Sintered* | $Al_2O_3$ Sprayed | $Al_2TiO_5$ Sprayed | $Al_2O_3$ Sprayed Infiltrated = CMC | $Al_2TiO_5$ Sprayed Infiltrated = CMC | $Al_2O_3$ with gradient structure, sprayed and infiltrated |
| Density | g/cm³ | 3.95 | 3.3 | 3.4 | 3.6 | 3.7 | 3.6–3.7 |
| Bending strength | MPa 4-point | 450 | 25 | 45 | 510 ± 50 | 490 ± 80 | 550 ± 40 |
| Modulus of elasticity | GPa | 400 | 22 | 13 | 250 ± 80 | 300 ± 100 | 350 ± 50 |
| Fracture toughness | MPa $\sqrt{m}$ | 3–5 | — | — | 10–12 | 13–15 | 15–18 |
| Hardness | Vicker ($HV_{200/20}$) | 1800 | 920 ± 250 | — | 1600 ± 300 | 1800 ± 300 | 1750 ± 300 |

*Literature values

We claim:

1. A method for the production of cermicmetal composite materials, in which ceramic materials are infiltrated with molten metals, consisting essentially of the steps of building up a porous ceramic material of several layers by spraying ceramic particles in a liquid-stabilized plasma jet on a base body, the thickness of the layers being between 10 and 150 microns with an average pore radius of between 100 and 1,000 nm, an open porosity of 5–14% and an overall porosity of 5–30%; and infiltrating molten metal into pores of the ceramic material up to a residual pore volume of 0.1 to 10%, based on initial porosity of the ceramic material.

2. The method as claimed in claim 1, wherein prior to infiltration, the ceramic material is preheated to a temperature greater than the temperature of the molten metal.

3. The method as claimed in claim 1, wherein the temperature of the molten metal is 100° C. above the melting point of the metal.

4. The method as claimed in claim 1, wherein, prior to infiltration, wetting-promoting and/or viscosity-lowering materials are added to the molten metal.

5. The method as claimed in claim 1, wherein the molten metal comprises aluminum or an aluminum alloy and, after infiltration, the infiltrated ceramic material is cooled at a rate of 200° C./h.

6. The method as claimed in claim 1, wherein the molten metal comprises steel or gray cast iron and, after infiltration, the infiltrated ceramic material is cooled a rate of 100° C./h.

7. The method as claimed in claim 1, wherein the particles have an average diameter $d_{50}$ of 20 to 180 microns in an initial state and, after being sprayed onto the base body, are flattened into longitudinal particles with a form factor of more than 5:1.

8. The method as claimed in claim 1, wherein the ceramic material is kept at a temperature between 100° and 500° C. during the plasma spraying.

9. The method as claimed in claim 1, wherein the size of the ceramic particles is increased during the spraying from an initial average diameter of 20 microns to a final average diameter of more than 100 microns.

10. The method as claimed in claim 1, wherein the ceramic material is added to a closed mold, heated to the melting temperature of the molten metal, evacuated and infiltrated within 5 to 60 seconds with the molten metal under pressure.

11. The method as claimed in claim 1, wherein, at the end of the spraying process for the production of the ceramic material, at least one layer of metallic material is applied on the ceramic material and the applied metal is then melted by increasing the temperature of the infiltrated porous ceramic material.

12. The method as claimed in claim 4, wherein the molten metal comprises aluminum or an aluminum alloy, and wherein the wetting-promoting and/or viscosity-lowering materials are chosen from the group consisting of bismuth, antimony, strontium, beryllium, sodium, potassium, and lithium.

* * * * *